United States Patent
Tsun

(10) Patent No.: US 8,949,405 B2
(45) Date of Patent: Feb. 3, 2015

(54) CONTENT SERVER LATENCY DETERMINATION

(75) Inventor: Stephen Tsun, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1168 days.

(21) Appl. No.: 11/836,019

(22) Filed: Aug. 8, 2007

(65) Prior Publication Data

US 2009/0040927 A1 Feb. 12, 2009

(51) Int. Cl.
*G06F 15/173* (2006.01)
*H04L 12/24* (2006.01)

(52) U.S. Cl.
CPC .......... *H04L 41/5009* (2013.01); *H04L 41/509* (2013.01)
USPC ....................................................... 709/224

(58) Field of Classification Search
CPC ................................. H04L 41/5009
USPC ......................................... 709/224; 370/508
See application file for complete search history.

(56) References Cited

U.S. PATENT DOCUMENTS

| | | | |
|---|---|---|---|
| 6,085,229 A * | 7/2000 | Newman et al. ............. 709/203 | |
| 6,405,252 B1 | 6/2002 | Gupta et al. | |
| 6,601,098 B1 | 7/2003 | Case | |
| 7,058,706 B1 | 6/2006 | Iyer et al. | |
| 7,475,067 B2 | 1/2009 | Clary et al. | |
| 7,475,089 B1 | 1/2009 | Geddes | |
| 2001/0010059 A1* | 7/2001 | Burman et al. ............... 709/224 |
| 2002/0099818 A1* | 7/2002 | Russell et al. ............... 709/224 |
| 2002/0120727 A1* | 8/2002 | Curley et al. ................. 709/223 |
| 2003/0065763 A1* | 4/2003 | Swildens et al. ............. 709/224 |
| 2003/0217147 A1 | 11/2003 | Maynard et al. | |
| 2005/0086602 A1 | 4/2005 | Philyaw et al. | |
| 2006/0031748 A1* | 2/2006 | Brady et al. ................. 715/500 |
| 2006/0253546 A1 | 11/2006 | Chang et al. | |

FOREIGN PATENT DOCUMENTS

JP 2002-163185 6/2002

OTHER PUBLICATIONS

International Search Report and Written Opinion for PCT Application No. PCT/US2008/07526, dated Aug. 7, 2008, 15 pages.

* cited by examiner

*Primary Examiner* — Esther Benoit
(74) *Attorney, Agent, or Firm* — Armstrong Teasdale LLP

(57) ABSTRACT

A performance of a publisher server, a first content server, and a second content server is determined. Latency time information is determined based on the publisher server performance, the first content server performance, and the second content server performance, the latency time information representing a length of time to load content associated with each of the publisher server, the first content server, and the second content server.

30 Claims, 6 Drawing Sheets

| | | |
|---|---|---|
| 78 | Information | Using Single Call, Synchronous Implementation |
| 78 | Information | Generated a correlator=1186164398133 |
| 78 | Information | FireFox version = 2.0.0.6, major= 2 ← 408 |
| 78 | Warning | Fetching Ads from Google has been suppressed |
| 78 | Information | Synchronous implementation: Skipping slotdata request |
| 1236 | Information | Skip Issuing fetch ads call for Newsletter1_250X50 |
| 1236 | Information | Skip Issuing fetch ads call for Newsletter2_250X50 |
| 1236 | Information | Skip Issuing fetch ads call for Newsletter3_250X50 |
| 1236 | Information | Skip Issuing fetch ads call for Newsletter4_250X50 |
| 1596 | Information | Skip Issuing fetch ads call for ROS_Mid_125X125 |
| 1596 | Information | Skip Issuing fetch ads call for ROS_Mid1_125X125 |
| 1612 | Information | Skip Issuing fetch ads call for ROS_Mid2_125X125 |
| 1612 | Information | Skip Issuing fetch ads call for ROS_Mid3_125X125 |
| 1612 | Information | Skip Issuing fetch ads call for ROS_Mid4_125X125 |
| 1612 | Information | Skip Issuing fetch ads call for ROS_Mid5_125X125 |
| 1612 | Information | Skip Issuing fetch ads call for ROS_Mid6_125X125 |
| 1612 | Information | Skip Issuing fetch ads call for ROS_Mid7_125X125 |
| 1612 | Information | Skip Issuing fetch ads call for ROS_Mid8_125X125 |
| 1612 | Information | Skip Issuing fetch ads call for ROS_Mid9_125X125 |
| 1612 | Information | Skip Issuing fetch ads call for ROS_Mid10_125X125 |
| 5900 | Information | Time to fetch ads from Google 0 ms |
| 5900 | Information | Time to render ads from Google 0 ms |
| 5900 | Information | Page loaded |

FIG. 5

| 502 | 504 | 506 |
|---|---|---|
| 4365 | Information | AdContents received for slots Newsletter1_250x50,Newsletter2_250x50,Newsletter3_250x50,Newsletter4_250x50,ROS_Mid_125x125,ROS_Mid1 |
| 4365 | Information | Issuing fetch ads call with http://stsunpc1.corp.google.com:8888/gampad/ads?correlator=1186164657090&output=json.html&callback= GA googleAdEngine.setAdContentsBy |
| 4490 | Information | AdContents received for slots Newsletter1_250x50,Newsletter2_250x50,Newsletter3_250x50,Newsletter4_250x50,ROS_Mid_125x125,ROS_Mid1 |
| 4505 | Information | Issuing fetch ads call with http://stsunpc1.corp.google.com:8888/gampad/ads?correlator=1186164657090&output=json.html&callback= GA googleAdEngine.setAdContentsBy |
| 4615 | Information | AdContents received for slots Newsletter1_250x50,Newsletter2_250x50,Newsletter3_250x50,Newsletter4_250x50,ROS_Mid_125x125,ROS_Mid1 |
| 4615 | Information | Issuing fetch ads call with http://stsunpc1.corp.google.com:8888/gampad/ads?correlator=1186164657090&output=json.html&callback= GA googleAdEngine.setAdContentsBy |
| 4771 | Warning | supressing slot ROS_Mild7_125X125 due to lack of content |
| 4771 | Information | Issuing fetch ads call with http://stsunpc1.corp.google.com:8888/gampad/ads?correlator=1186164657090&output=json.html&callback= GA googleAdEngine.setAdContentsBy |
| 4771 | Information | AdContents received for slots Newsletter1_250x50,Newsletter2_250x50,Newsletter3_250x50,Newsletter4_250x50,ROS_Mid_125x125,Ros_Mid1 |
| 6946 | Warning | supressing slot ROS_Mild7_125X125 due to lack of content |
| 6946 | Information | Issuing fetch ads call with http://stsunpc1.corp.google.com:8888/gampad/ads?correlator=1186164657090&output=json.html&callback= GA googleAdEngine.setAdContentsBy |
| 7040 | Information | AdContents received for slots Newsletter1_250x50,Newsletter2_250x50,Newsletter3_250x50,Newsletter4_250x50,ROS_Mid_125x125,ROS_Mid1 |
| 7040 | Warning | supressing slot ROS_Mild7_125X125 due to lack of content |
| 7055 | Information | Issuing fetch ads call with http://stsunpc1.corp.google.com:8888/gampad/ads?correlator=1186164657090&output=json.html&callback= GA googleAdEngine.setAdContentsBy |
| 7165 | Information | AdContents received for slots Newsletter1_250x50,Newsletter2_250x50,Newsletter3_250x50,Newsletter4_250x50,ROS_Mid_125x125,ROS_Mid1 |
| 7165 | Warning | supressing slot ROS_Mild7_125X125 due to lack of content |
| 7306 | Information | Time to fetch ads from Google 5336 ms |
| 7306 | Information | Time to render ads from Google 0 ms ← 508 |
| 7306 | Information | Page loaded |

# CONTENT SERVER LATENCY DETERMINATION

FIELD

This disclosure relates to information retrieval.

BACKGROUND

Content displayed on a web page can be generated by one or more content item servers in response to content item requests that are generated during the rendering of the web page by a client device. The content item requests can be generated synchronously with respect to the rendering of the web page. Likewise, the content items received in response to the content item requests can be processed synchronously with respect to the rendering of the web page. For example, when a web page is rendered, JavaScript may execute and request an advertisement from a first content server. In turn, the first content server may request an advertisement from a second content server. If the advertisement is retrieved synchronously, the rendering of the web page is delayed until a requested advertisement is received from a content server. Once the advertisement is received and rendered, e.g., displayed on the web page, the rendering of the remainder of the web page resumes.

A drawback of synchronous content item retrieval is that if a content item server is slow, then the rendering of the remainder of the web page will be delayed. To mitigate the potential effects of synchronous content item processing, web page publishers attempt to identify the source of the delay, i.e., the content item server that may be slow or temporarily inoperable, and to calculate the total latency times. However, it is often a complex task to compile the multiple HTTP requests and responses from the rendering of a web page in order to calculate the latency times associated with the different servers. For example, the multiple HTTP requests and responses may look unfamiliar, as they do not appear on the web page itself, but are returned by the first content server.

SUMMARY

Disclosed herein are systems and methods for determining latency times associated with content requests. According to some implementations, a performance of a publisher server, a first content server, and a second content server is determined. Latency time information is determined based on the publisher server performance, the first content server performance, and the second content server performance. The latency time information can represent a length of time to load content associated with each of the publisher server, the first content server, and the second content server.

According to some implementations, a Uniform Resource Locator (URL) of a document containing a reference to a script with a first behavior can be specified, wherein a first argument is added to the URL. The URL of the document containing a reference to the script with a second behavior can be specified, wherein a second argument is added to the URL. The document containing the script is received in response to the requests. The script with the first behavior is executed to determine a publisher server latency time, and the script with the second behavior is executed to determine a first content server latency time. A second content server latency time is determined based on the publisher server latency time and the first content server latency time.

According to some implementations, a system includes a processor configurable to determine a performance associated with a publisher server, a first content server, and a second content server. A client device is configurable to determine latency time information based on the publisher server performance, the first content server performance, and the second content server performance, the latency time information representing a length of time to load content associated with each of the publisher server, the first content server, and the second content server. According to some implementations, a system includes a processor configurable to request content from one or more remote locations, wherein the content includes computer executable instructions to determine latency information associated with the request. An interface that is operatively coupled to the processor is configurable to display the latency information, the latency information including latency times associated with the one or more remote locations associated with the display of the content in the interface.

BRIEF DESCRIPTION OF THE DRAWINGS

FIG. 4 illustrates an example interface displaying the output of NoFetch mode.

FIG. 5 illustrates an example interface displaying the output of NoRender mode.

DETAILED DESCRIPTION

Figure 1:
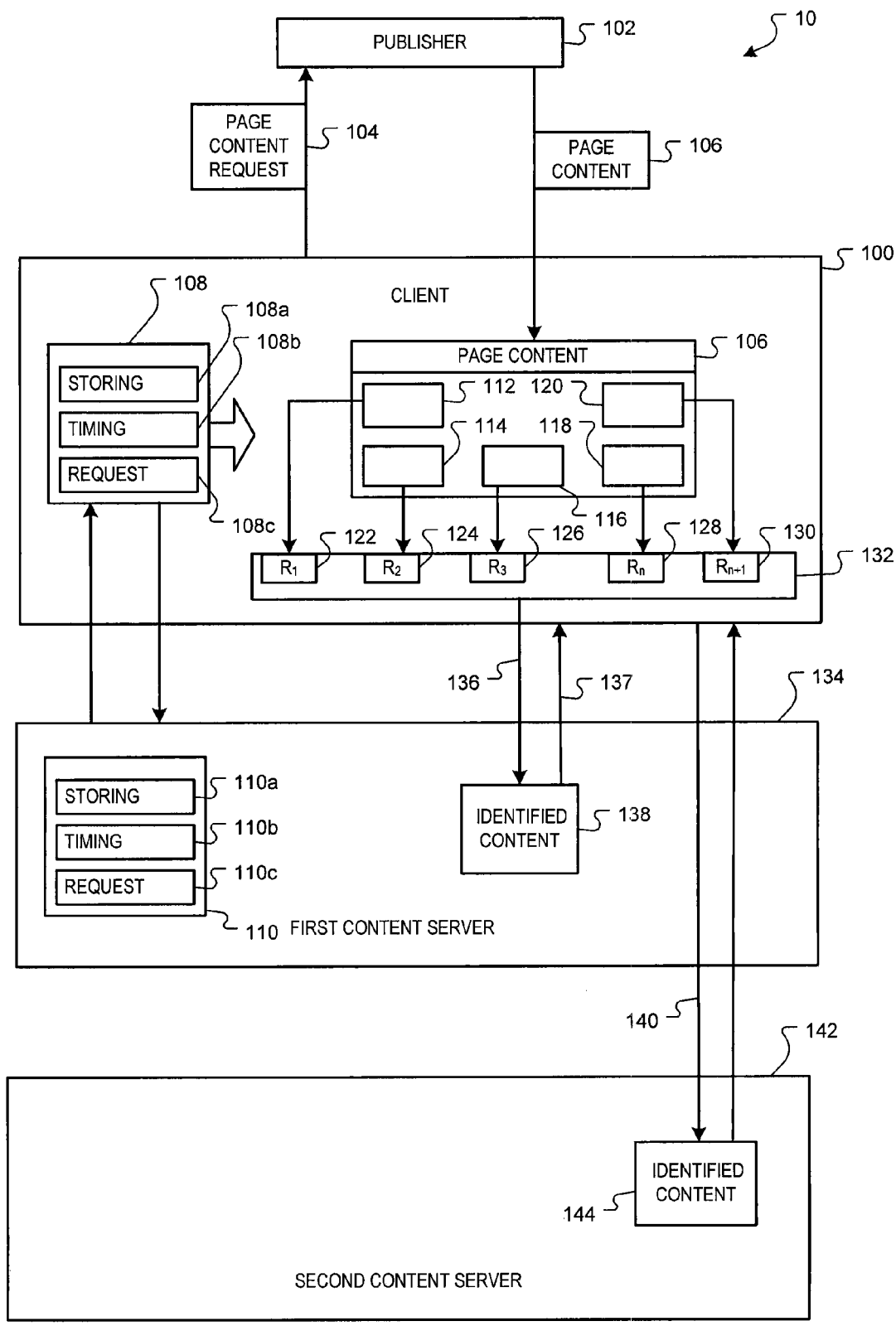
FIG. 1 is a block diagram of an example system for requesting content from a content server.

FIG. 1 is a block diagram of an example system 10 for requesting content from one or more content servers. In one implementation, the content may include advertisements, and the content servers can be content servers. Different types of content can also be requested.

In one implementation, a client system 100 is configured to view content (e.g., visit web pages) accessible through a network, e.g., the Internet. The client system 100 can, for example, be a web browser, or a computing device executing network navigation software, etc. A web address (e.g., Uniform Resource Locator (URL)) visited by the client system 100 can be resolved to identify a publisher 102, e.g. a server, hosting a corresponding web page. In this example, a client system 100 can send a web page content request 104 to the publisher 102 for the web page content 106. The publisher 102, in response to the request, provides the web page content 106 to the client system 100 as, e.g., an HTML document containing JavaScript. The web page content 106 can include one or more content presentations. In an implementation, the content presentations can include advertisement slots for advertisements to be served by a content server. Other content presentations can also be used.

The web page content 106 provided by the publisher 102 includes a reference to a set of instructions 108. In an implementation, the instructions 108 include storing instructions 108a, timing instructions 108b and request instructions 108c that are used to render and present the requested content, e.g., advertisements. In an implementation, the instructions 108 are provided by a first content server 134, e.g., a content server, and are stored at the client system 100, such as in a cache associated with a web browser.

The web page content 106 can define content slots 112-120 that are configured to display content from the one or more content servers. In an implementation, the content slots 112-120 are advertisement slots that are defined within HTML tags. The instructions 108 generate content requests 122-130 that are issued to request content to fill the content slots 112 to 120. In an implementation, the requests 122 to 130 are stored in a data store 132, such as a buffer 132, and then sent to the content server 134 in one or more requests 136.

In an implementation, the first content server 134 processes the received individual or combined requests 136 and returns identified content 138 to the client system 100. In another implementation, the first content server 134 processes the received individual or combined requests 136 from the client system 100 and sends a combined response 137 to the client system 100. For example, the response can be in HTML or JavaScript. The combined response 137 to the client system 100 from the first content server 134 can instruct the client system 100 to send one or more requests 140 to a second content server 142 requesting content items. The second content server 142 can then, for example, return identified content 144 to the client system 100. The identified content 138 and/or 144 can then be displayed as part of the publisher's web page in the corresponding content slots, e.g., content slots 112, 114 and 116.

An example of the first content server 134 can include a Google™ content server. Requests can be made to the Google™ content server to fill content slots on the web page with advertisements. In turn, the Google™ content server can identify and provide advertisements, or the Google™ content server can requests advertisements from the second content server 142, i.e., a third party content server. While reference is made to only two content servers 134 and 142, more than two content servers can provide content to a single web page.

When the client system 100 requests content from the publisher 102, the first content server 134, and/or the second content server 142, latency delays can occur. For example, the latency delays can be related to a variety of issues, such as a slow network speed, the publisher server 102 is slow, the first content server 134 is slow, and/or the second content server 142 is slow. A user of the client system 100 can only see a total latency time it takes for the web page to load. Therefore, determining the latency delay contributions attributed to the publisher server 102, first content server 134, and second content server 142 can be difficult to demonstrate.

As described in the example above, a total latency time (L) to display a web page can be attributed to the speed of the network, the publisher server 102 speed (L1), which includes network latency time, the first content server 134 speed (L2), and the second content server 142 speed (L3). Therefore, by way of example, the calculation for the total latency time can be determined by L=L1+L2+L3.

Figure 2:
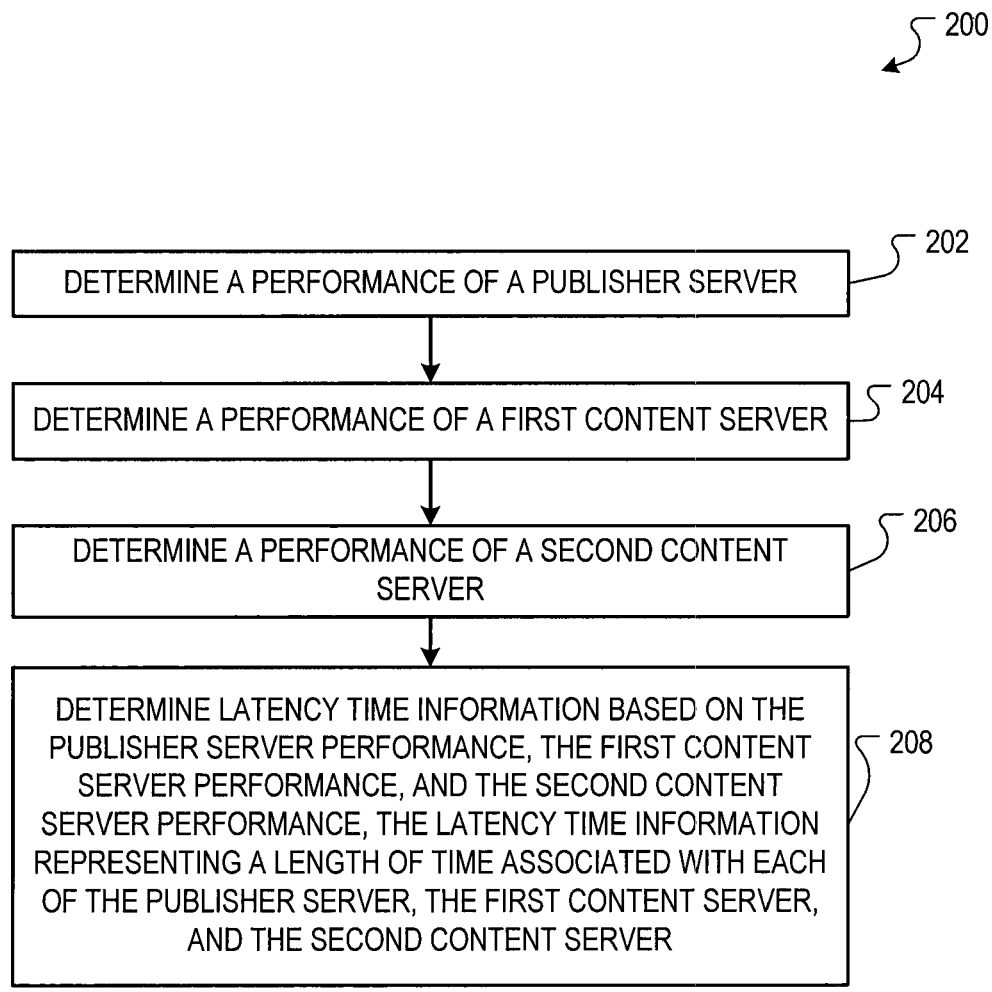
FIG. 2 is an example process for determining latency contributions.

With reference to FIG. 2, in accordance with some implementations, an example process 200 to determine latency contributions begins with determining a performance of a publisher server (step 202). To determine the performance of the publisher server 102, a request for content from a publisher server 102 can be made by including an argument (or other indicator) with the request. For example, the argument "google_nofetch" can be added to the URL of a web page content location as follows: http://www.webpage.com?google_nofetch to implement a NoFetch mode.

A document associated with the requested URL can be received from a content location. The document can include web page content, media, text, a downloadable file, etc. The performance, i.e., a latency time, associated with the publisher server 102 can be determined. In some implementations, the content serving (e.g., JavaScript) tags within the web page content 106 implement diagnostic logic. For example, a script file within the web page content 106 can test for various conditions, such as the latency time associated with the publisher server 102, and write information to a user interface.

In a NoFetch mode, a script file within the web page content 106 can prevent the retrieval of content items from the first content server 134, i.e., requests made to the first content server 134 for advertisements. For example, any requests transmitted to the first content server 134 can be replaced with a NO-OP instruction, such that they do nothing (other than generating a debug trace). Therefore, running in NoFetch mode can establish a baseline performance for the publisher server 102 for a web page, i.e., a NoFetch latency time (L1) a user would experience if the publisher did not add any advertisements to the web page.

Next, a performance associated with the first content server 134 is determined (step 204). To determine the performance of the first content server 134, an argument (or other indicator) can be included with the URL of a web page location. For example, the argument "google_norender" can be added to the URL of a web page content location as follows: http://www.webpage.com?google_norender to implement a NoRender mode.

In some implementations, the content serving (e.g., JavaScript) tags within the web page content 106 implement diagnostic logic. For example, a script file within the web page content 106 can test for various conditions, such as the performance, i.e., the latency time, associated with the first content server 134, and write information to a user interface.

In a NoRender mode, a script file within the web page content 106 can return content items from the first content server 134, i.e., requests can be sent to first content server 134 to retrieve advertisements. However, after the first content server 134 retrieves the advertisements, the script file can prevent the advertisements from being rendered on the web page. For example, instead of rendering the actual advertisement on the web page in content slots 112, 114 and 116, the code associated with the advertisement in the content slots 112, 114 and 116 is displayed. Therefore, running the NoRender mode can establish a performance, i.e., a latency time, for a first content server 134 to retrieve the advertisements, but not render them. The latency time associated with the first content server 134 can be calculated by subtracting the NoFetch latency time from the NoRender latency time, i.e., L2=NoRender latency time−NoFetch latency time (L1).

In step 206, a performance of the second content server 142 can be determined. To determine the performance of the second content server 142, a request for content from the first content server 134 can be made by requesting the URL of a web page content location, without an argument, as follows: http://www.webpage.com. The total page load time associated with requesting and rendering the URL is equivalent to the total latency time (L). Thus, the latency time associated with the second content server 134 can be calculated by subtracting the NoRender latency time from the total latency time, i.e., L3=total latency time (L)−NoRender (L2).

After the performance of the publisher server, first content server, and second content server are determined, a determination of latency time information can be determined based on the publisher server performance, the first content server performance, and the second content server performance (step 208). The latency time information can represent a length of time to load content associated with each of the publisher server, the first content server, and the second content server. For example, a user interface can be spawned and information regarding the latency times attributed to the different components is written to the user interface. In some implementations, the user interface is created by JavaScript code that provides a separate browser window.

Figure 3:
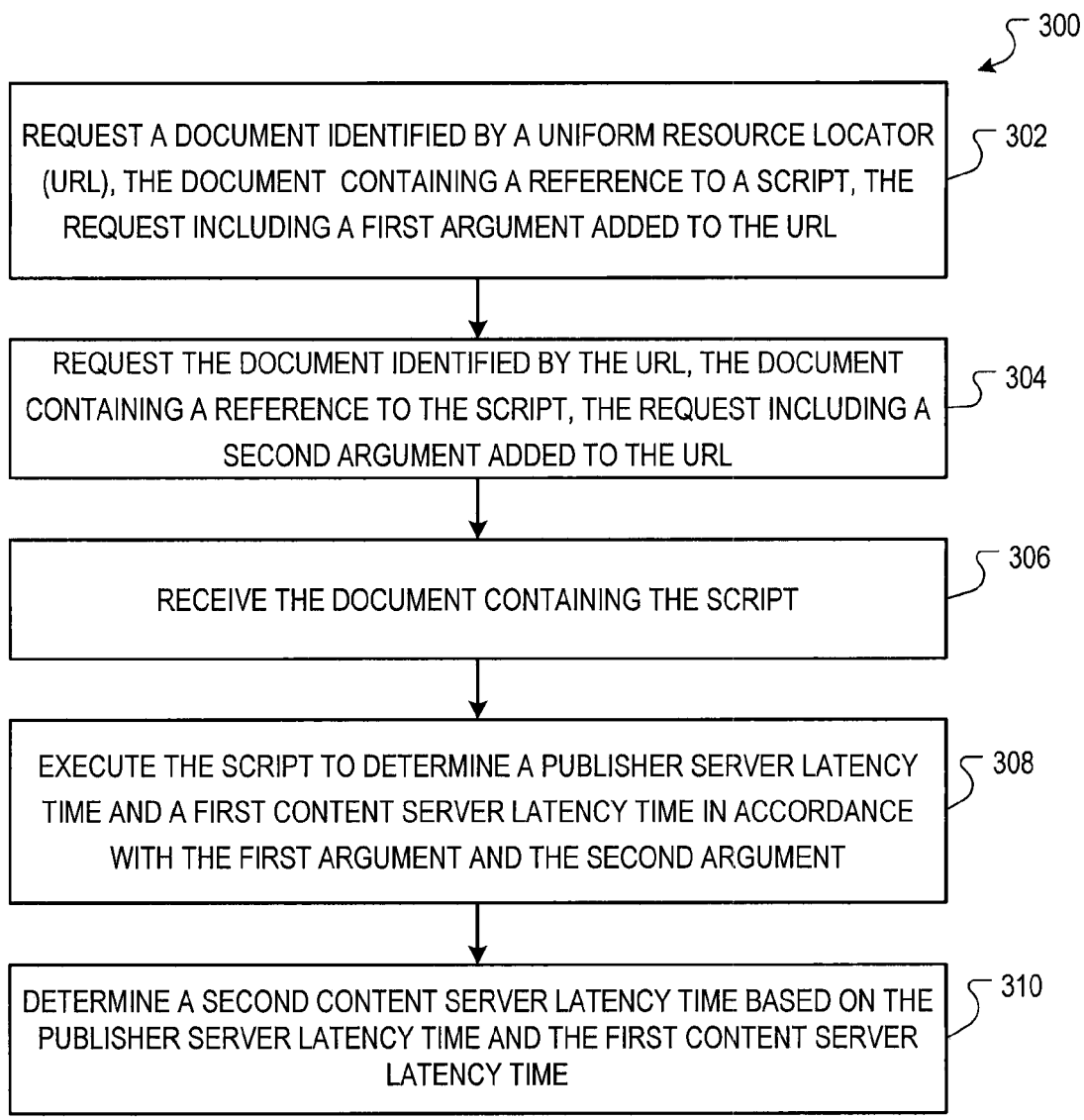
FIG. 3 is another example process for determining latency contributions.

FIG. 3 is another example process 300 for determining latency contributions. The example process 300 for determining the latency contributions begins with submitting a Uniform Resource Locator (URL) to request a document containing a reference to a script, the request including a first argument added to the URL (step 302). For example, the first argument "google_nofetch" can be added to the URL of a web page content location as follows: http://www.web page.com?google_nofetch to implement a NoFetch mode.

Next, the process 300 can submit the URL to request the document containing a reference to the script, the request including a second argument added to the URL (step 304). For example, an argument "google_norender" can be added to the URL of a web page content location as follows: http://www.web page.com?google_norender to implement a NoRender mode.

In response to the requests in steps 302 and 304, the document containing the script can be received (step 306). After receiving the document, the script can be executed to determine the publisher server latency time and the first content server latency time in accordance with the first argument and the second argument (step 308). For example, the script can execute the NoFetch mode in accordance with the first argument, and the script can execute the NoRender mode in accordance with the second argument. Based on the publisher server latency time and the first content server latency time, a second content server latency time can be determined (step 310).

FIG. 4 illustrates an example interface 400 displaying the output of the script with the first behavior executing the NoFetch mode. Column 402 of FIG. 4 indicates the latency time associated with the executed instructions of the NoFetch mode. For example, the latency time is presented as a running time that increases as the script executes. Column 404 of FIG. 4 provides a message type for the instructions that are being processed by the script executing the NoFetch mode. Column 406 of FIG. 4 provides a summary message indicating the instructions that are being processed by the script executing the NoFetch mode. In NoFetch mode, the executing script file within the web page content 106 can prevent the retrieval of advertisements from the one or more content servers. As indicated at 408 of FIG. 4, the script suppresses the fetching of the ads; therefore, the latency time information in NoFetch mode can be associated with the publisher server.

After executing the script with the first behavior, the script with the second behavior can be executed to determine the first content server latency time (step 310). The script with the second behavior can execute the NoRender mode. FIG. 5 illustrates an example interface 500 displaying the output of NoRender mode. Column 502 of FIG. 5 indicates the latency time associated with the script executing the NoRender mode. For example, the latency time is presented as a running time that increases as the script executes. Column 504 of FIG. 5 provides a message type for the instructions that are being processed by the script executing the NoRender mode. Column 506 of FIG. 5 provides a summary message indicating the instructions that are being processed by the script executing the NoRender mode. Running the NoRender mode can establish a performance for a first content server 134 to retrieve the advertisements, but not render them, as displayed at 508 of FIG. 5. The latency time associated with the first content server 134 can be calculated by subtracting the NoFetch latency time from the NoRender latency time, i.e., L2=NoRender latency time−NoFetch latency time (L1).

After running the document in NoFetch and NoRender mode, the second content server latency time can be determined based on the publisher server latency time and the first content server latency time. To determine the performance of the second content server 134, a request for content from the first content server 134 can be made by submitting the URL of a web page content location to the publisher server 102, without an argument, as follows: http://www.web page.com. The total page load time associated with requesting and rendering the URL is substantially equivalent to the total latency time (L). Thus, the latency time associated with the second content server 134 can be calculated by subtracting the NoRender latency time from the total latency time, i.e., L3=total latency time (L)−NoRender latency time (L2).

Figure 6:
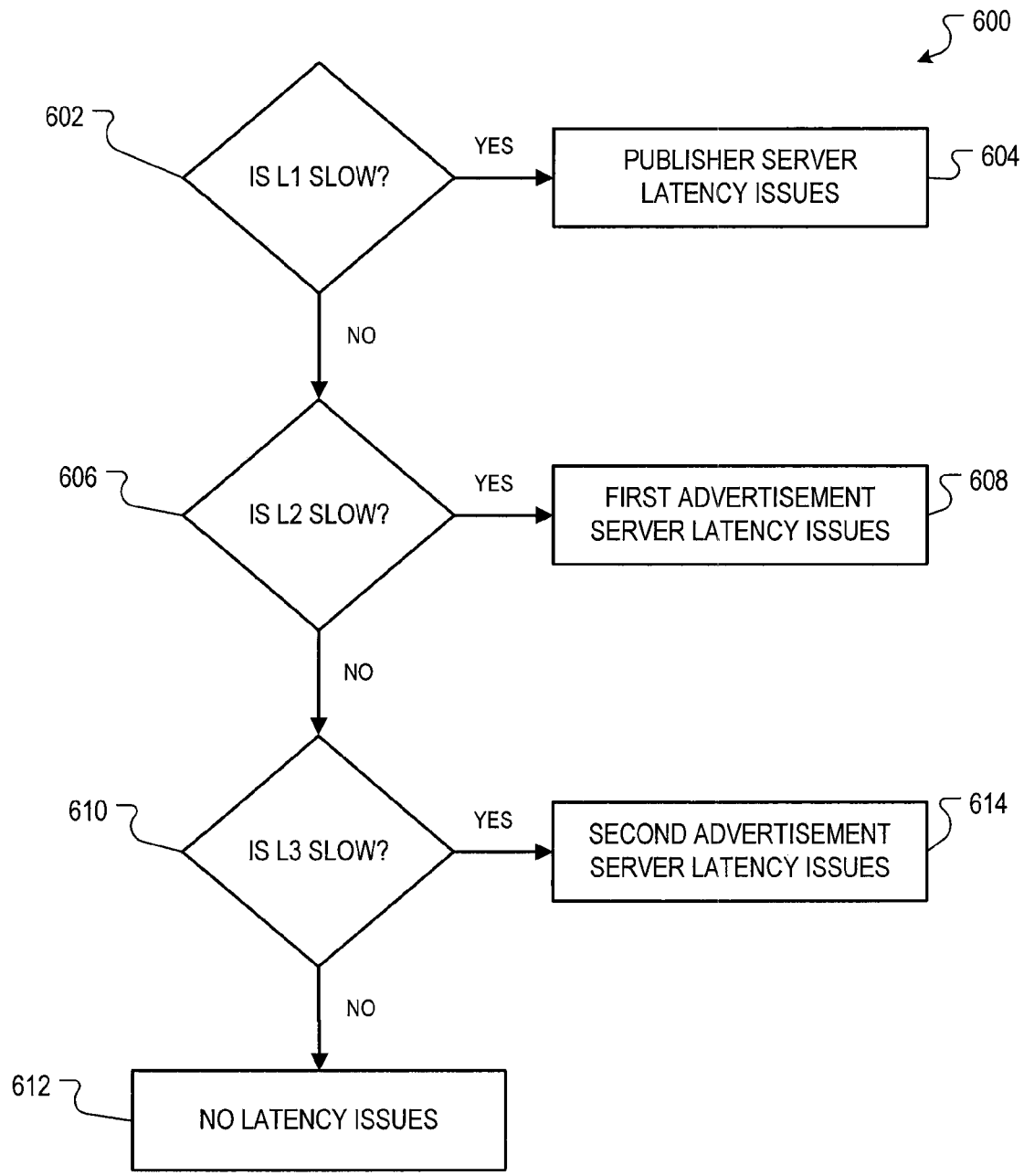
FIG. 6 is an example process for determining a source of latency issues.

FIG. 6 is an example process 600 for determining the source of a latency effect. Based on the determination of the latency times associated with a publisher server, a first content server, and a second content server, the source of the slow load times associated with a content page can be determined. If L1 is determined to be slow in decision step 602, then the source of the latency is most likely attributed to the publisher server 102 (step 604). However, if L1 is determined to be fast in decision step 602, the process 600 moves to decision step 606. In decision step 606, if L2 is determined to be slow, then the source of the latency is most likely attributed to the first content server 134 (step 608). If L2 is determined to be fast in decision step 606, the process 600 moves to decision step 610. In decision step 610, if L3 is determined to be fast, latency with the content page load time can be deemed as low (L1, L2, and L3 are all determined to be fast) (step 612). However, if L3 is determined to be slow in decision step 610, then the source of the latency is most likely attributed to the second content server 142 (step 614).

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   determining a performance of a publisher server, comprising:
   transmitting, from a client device, a first request for a document to the publisher server, wherein the document includes one or more slots for presenting additional content to be received from one or more content servers different from the publisher server, and wherein the document references a script that causes retrieval and rendering of the additional content by the client device when executed in an operation mode by the client device, and prevents retrieval of the additional content by the client device when executed in a first diagnostic mode by the client device;

receiving the requested document from the publisher server in response to the first request; and executing, by the client device, the script according to the first diagnostic mode to determine the publisher server performance including preventing retrieval of the additional content by the client device while allowing retrieval of the document by the client device from the publisher server.

2. The method of claim 1, wherein the publisher server performance comprises:

a requesting time to retrieve the document from the publisher server; and a rendering time to render the document.

3. The method of claim 1, wherein executing the script according to the first diagnostic mode to determine the publisher server performance further comprises:

replacing content requests to the one or more content servers with non-content-request instructions.

4. The method of claim 1, wherein transmitting the first request to the publisher server further comprises:

appending an indicator to a requested Uniform Resource Locator (URL) in the first request, the indicator specifying the first diagnostic mode.

5. The method of claim 1, further comprising:

displaying a user interface; and displaying the publisher server performance in the user interface.

6. The method of claim 5, wherein displaying the publisher server performance comprises:

displaying running time information in the user interface representing a length of time to load content associated with the publisher server.

7. A computer-implemented method, comprising:

transmitting, by a client device, three requests for a document identified by a Uniform Resource Locator (URL) to a publisher server, the document including one or more slots for presenting additional content to be retrieved from two or more content servers different from the publisher server, the document containing a reference to a script, and each request including no argument, a first argument, or a second argument added to the URL and causing the script to be executed by the client device in a respective one of three different modes: (1) an operation mode causing retrieval of the additional content by the client device from both of a first and a second content server, (2) a first diagnostic mode preventing retrieval of the additional content by the client device from each of the first and the second content servers, and (3) a second diagnostic mode causing retrieval of the additional content by the client device from the first content server but preventing retrieval of the additional content by the client device from the second content server;

receiving the document in response to each of the three requests;

executing, by the client device, the script according to the first diagnostic mode to determine a publisher server latency time, and according to the second diagnostic mode to determine a first content server latency; and executing the script, by the client device, according to the operation mode to determine a second content server latency time based on the publisher server latency time and the first content server latency time.

8. The method of claim 7, further comprising:

displaying at least one of the publisher server latency time, the first content server latency time, and the second content server latency time in a user interface, the user interface including running time information representing a length of time to load content associated with at least one of the publisher server, the first content server, or the second content server.

9. A system, comprising:

a processor coupled to a memory, said processor configurable to determine a performance associated with a publisher server, a first content server, and a second content server;

a client device configurable to determine latency time information based on the publisher server performance, the first content server performance, and the second content server performance, the latency time information representing a length of time to load content associated with each of the publisher server, the first content server, and the second content server, wherein:

the processor is further configurable to:

transmit three requests for a document identified by a Uniform Resource Locator (URL) to the publisher server, the document including one or more slots for presenting additional content to be retrieved from two or more content servers different from the publisher server, the document containing a reference to a script, and each request including no argument, a first argument, or a second argument added to the URL and causing the script to be executed by the client device in a respective one of three different modes: (1) an operation mode causing retrieval of the additional content by the client device from both of a first and a second content server, (2) a first diagnostic mode preventing retrieval of the additional content by the client device from each of the first and the second content servers, and (3) a second diagnostic mode causing retrieval of the additional content by the client device from the first content server but preventing retrieval of the additional content by the client device from the second content server;

receive the document in response to each of the three requests;

execute the script according to the first diagnostic mode to determine a publisher server latency time, and according to the second diagnostic mode to determine a first content server latency time; and execute the script according to the operation mode to determine a second content server latency time based on the publisher server latency time and the first content server latency time.

10. The system of claim 9, wherein the client device is further configurable to:

display at least one of the publisher server performance, the first content server performance, or the second content server performance in a user interface, the user interface including running time information representing a length of time to load content associated with at least one of the publisher server, the first content server, or the second content server.

11. A system, comprising:

a client device including a processor coupled to a memory, said processor configurable to execute instructions and perform operations comprising:

transmitting a first request for a document to a first remote location, wherein the document includes one or more slots for presenting additional content to be received from two or more other remote locations different from the first remote location, and wherein the document references a script that causes retrieval and rendering of the additional content by the client device when executed in an operation mode by the client device, and prevents retrieval of the additional content by the client device when executed in a first diagnostic mode by the client device;

receiving the requested document from a publisher server in response to the first request; and executing the script according to the first diagnostic mode to determine the publisher server performance including preventing retrieval of the additional content by the client device while allowing retrieval of the document by the client device from the publisher server; and an interface operatively coupled to the processor and configurable to display the determined publisher server performance.

12. A computer-readable storage device having instructions stored thereon, which, when executed by a client device including a processor, cause the client device to perform the operations of:

determining a performance associated with a publisher server, comprising:

transmitting a first request for a document to the publisher server, wherein the document includes one or more slots for presenting additional content to be received from one or more content servers different from the publisher server, wherein the document references a script that causes retrieval and rendering of the additional content by the client device when executed in an operation mode by the client device, and prevents retrieval of the additional content by the client device when executed in a first diagnostic mode by the client device;

receiving the requested document from the publisher server in response to the first request; and executing the script according to the first diagnostic mode to determine the publisher server performance including preventing retrieval of the additional content by the client device while allowing retrieval of the document by the client device from the publisher server.

13. The method of claim 1, further comprising:

determining a performance of a first content server that supplies the additional content or a reference to the additional content.

14. The method of claim 13, further comprising:

determining a performance of a second, different content server that supplies content that is requested according to the reference supplied by the first content server.

15. The method of claim 14, further comprising:

determining latency time information based on the publisher server performance, the first content server performance, and the second content server performance, the latency time information representing a length of time to load content associated with each of the publisher server, the first content server, and the second content server.

16. The method of claim 13, wherein the first content server performance comprises:

a first content retrieval time to request and retrieve content or reference to content from the first content server.

17. The method of claim 13, wherein the reference to the additional content refers to a second, different content server, wherein the script prevents retrieval of the additional content from the second content server when executed in a second, different diagnostic mode, and wherein determining the performance of the first content server comprises:

transmitting a second request for the document to the publisher server;

receiving the document in response to the second request; and executing the script according to the second diagnostic mode to determine the first content server performance.

18. The method of claim 14, wherein determining the performance of the second content server comprises:

transmitting a third request for the document to the publisher server;

receiving the document in response to the third request; and executing the script according to the operation mode to determine the second content server performance.

19. The system of claim 11, wherein the operations further comprise:

determining a performance of a first content server that supplies the additional content or a reference to the additional content.

20. The system of claim 19, wherein the operations further comprise:

determining a performance of a second, different content server that supplies content that is requested according to the reference supplied by the first content server.

21. The system of claim 20, wherein the operations further comprise:

determining latency time information based on the publisher server performance, the first content server performance, and the second content server performance, the latency time information representing a length of time to load content associated with each of the publisher server, the first content server, and the second content server.

22. The computer-readable storage device of claim 12, wherein the operations further comprise:

determining a performance of a first content server that supplies the additional content or a reference to the additional content.

23. The computer-readable storage device of claim 22, wherein the operations further comprise:

determining a performance of a second, different content server that supplies content that is requested according to the reference supplied by the first content server.

24. The computer-readable storage device of claim 23, wherein the operations further comprise:

determining latency time information based on the publisher server performance, the first content server performance, and the second content server performance, the latency time information representing a length of time to load content associated with each of the publisher server, the first content server, and the second content server.

25. The method of claim 14, wherein the first content server performance comprises:

a first advertisement request time to request advertisements from the first content server; and a second advertisement request time to request advertisements from the second content server.

26. The method of claim 14, wherein the script causes retrieval of the additional content from the second content server and prevents rendering of the additional content on the client device when executed according to a second, different diagnostic mode, and wherein determining the performance of the first content server comprises:

transmitting, from the client device, a second request for the document to the publisher server;

receiving the document in response to the second request; and executing the script according to the second diagnostic mode to determine the first content server performance.

27. The method of claim 26, wherein transmitting the second request to the publisher server further comprises:
appending an indicator to a requested Uniform Resource Locator (URL) in the second request, the indicator specifying the second diagnostic mode.

28. The method of claim 13, further comprising:
displaying a user interface; and
displaying the first content server performance in the user interface.

29. The method of claim 28, wherein displaying the first content server performance comprises:
displaying running time information in the user interface representing a length of time to load content associated with the first content server.

30. The method of claim 14, wherein the second content server performance comprises:
a rendering time to render advertisements from the second content server.

* * * * *